United States Patent
Sudhakar

[11] Patent Number: 5,851,382
[45] Date of Patent: Dec. 22, 1998

[54] SELECTIVE HYDRODESULFURIZATION OF CRACKED NAPHTHA USING HYDROTALCITE-SUPPORTED CATALYSTS

[75] Inventor: Chakka Sudhakar, Fishkill, N.Y.

[73] Assignee: Texaco Inc., White Plains, N.Y.

[21] Appl. No.: 573,747

[22] Filed: Dec. 18, 1995

[51] Int. Cl.⁶ .................................................. C10G 45/04
[52] U.S. Cl. .............................. 208/216 R; 208/216 PP; 208/217; 208/226
[58] Field of Search ................................ 208/216 R, 217, 208/216 PP, 226

[56] References Cited

U.S. PATENT DOCUMENTS

| | | | |
|---|---|---|---|
| 4,132,632 | 1/1979 | Yu et al. | 208/216 R |
| 4,454,244 | 6/1984 | Woltermann | 502/305 |
| 5,340,466 | 8/1994 | Dai et al. | 208/217 |
| 5,358,633 | 10/1994 | Dai et al. | 208/217 |
| 5,441,630 | 8/1995 | Dai et al. | 208/217 |
| 5,459,118 | 10/1995 | Dai et al. | 502/300 |

*Primary Examiner*—Walter D. Griffin
*Attorney, Agent, or Firm*—Henry H. Gibson; Carl G. Ries

[57] ABSTRACT

Hydrodesulfurization of cracked naphtha, with minimum attendant hydrogenation of olefins, is effected over a sulfided catalyst bearing (i) a non-noble Group VIII metal, and (ii) a Group VI-B metal, and (iii) a metal of Group I-A, and optionally (iv) a metal of Group II-A, on a support comprising hydrotalcite-like composition, optionally containing less than or equal to 20% by weight of an inert inorganic compound selected from the group consisting of silica, silica-alumina, titania, clays, carbon black, and mixtures thereof, used as a binder.

11 Claims, No Drawings

SELECTIVE HYDRODESULFURIZATION OF CRACKED NAPHTHA USING HYDROTALCITE-SUPPORTED CATALYSTS

CROSS REFERENCE

This application is related to U.S. Pat. Nos. 5,340,466 and 5,459,118.

FIELD OF THE INVENTION

This invention relates to hydrotreating of cracked naphtha. More particularly it relates to a process for selectively deep hydrodesulfurizing a cracked naphtha containing olefins under conditions to minimize saturation of the olefin content and to a novel selective hydrodesulfurization catalyst.

BACKGROUND OF THE INVENTION

It is well known that air pollution is a serious environmental problem. A major source of air pollution worldwide is the exhaust from fuel combusted in hundreds of millions of motor vehicles. Regulations have been enacted reflecting the need to reduce harmful motor vehicle emissions through more restrictive fuel standards. Fuels containing sulfur produce sulfur dioxide and other pollutants which lead to a host of environmental concerns, such as smog and related health issues, acid rain leading to deforestation, and water pollution, as well as a number of other environmental problems. In addition, the sulfur compounds in the exhaust gases of the automobiles are detrimental to the efficient functioning of the catalytic converter in the automobile, leading to increased pollution. To help reduce or eliminate these environmental problems, the sulfur content of fuels has been, and will continue to be, restricted to increasingly smaller concentrations, such as, for example, less than 100 or even 50 parts per million (ppm).

The problem of sulfur in fuels is compounded in many areas where there are diminishing or no domestic sources of crude oil having relatively low sulfur content. For example, in the United States the supply of domestic oil production relies increasingly on lower grade crude oil with higher sulfur content. The need for lower sulfur content fuel therefore increases demand for imported oil having lower sulfur content, thereby increasing trade imbalance and vulnerability due to dependence on foreign sources of oil.

The sulfur content in crude oil can take the form of a wide variety of both aliphatic and aromatic sulfurous hydrocarbons.

Various techniques have been developed for removing sulfur compounds. One such technique, called catalytic hydrodesulfurization (HDS), involves reacting hydrogen with the sulfur compounds in the presence of a catalyst. The general HDS reaction is illustrated in Equation 1.

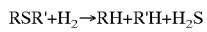

RSR'+H$_2$→RH+R'H+H$_2$S

Equation 1: Hydrodesulfurization Reaction

In the Equation 1, the sulfur compound RSR' can be: a thiol or mercaptan, where R is hydrocarbyl and R' is hydrogen; a sulfide or disulfide, where the sulfur is connected to another sulfur atom in R or R' hydrocarbyl groups; or can be a thiophene where R and R' are connected to form a heterocyclic ring. The HDS reaction consumes hydrogen (H$_2$) and produces hydrogen sulfide (H$_2$S) and hydrocarbons. The hydrogen sulfide can then be separated to give a petroleum product in which the sulfur is significantly reduced or substantially eliminated.

HDS is one process within a class of processes called hydrotreating, or hydroprocessing, involving the introduction and reaction of hydrogen with various hydrocarbonaceous compounds.

Some of the other reactions that take place simultaneously during the hydrotreating process are hydrodenitrogenation (HDN), which is the removal of nitrogen in the carbonaceous compounds containing nitrogen as ammonia, hydrodeoxygenation (HDO), which is the removal of oxygen from carbonaceous compounds containing oxygen as water, and hydrogenation (HYD) of unsaturated hydrocarbons such as olefins and aromatics.

The hydrotreating reactions can occur simultaneously to various degrees when sulfur-, oxygen-, and nitrogen-containing and unsaturated compounds are present in the petroleum. The hydrotreating reactions are exothermic, producing heat. Such hydrotreatment has been used to remove not only sulfur, but to also remove nitrogen and other materials like metals, not only for environmental considerations but for other reasons, such as to protect catalysts used in subsequent processing from being poisoned by such elements. See, for example, Applied Industrial Catalysis, Volume I, edited by B. E. Leach, Academic Press (1983); Chemistry of Catalytic Processes, by B. C. Gates et al., McGraw-Hill (1979); and Applied Heterogeneous Catalysis: Design Manufacture Use of Solid Catalysts, by J. F. LePage et al., Technip, Paris (1987).

As is well known to those skilled in the art, cracked naphtha obtained as a product of a cracking operation or a coking operation may contain a significant concentration of sulfur—up to as much as 13,000 wppm. Though this stream constitutes only 35–40% of the total gasoline pool, it contributes a substantial quantity of undesired sulfur to the gasoline pool. The other 60–65% of the pool typically contains much lower quantities of sulfur. It is possible to decrease the sulfur content by (i) hydrotreating the entire feedstock to the cracking/coker unit or (ii) hydrotreating the product naphtha from these units.

The first noted alternative is a "brute force" effort that is very expensive in that it requires a large hydrotreater, and it consumes significant quantities of hydrogen. The second noted alternative is a more direct approach, that is to hydrodesulfurize the cracked naphtha. But unfortunately HDS of naphtha using standard hydrotreating catalysts under conditions required for sulfur removal results in undesirable saturation of the olefins typically originally present in amount of 20 v %–60 v %, down to levels as low as 2 v %; and this reduces the octane number (Octane Number is the average of the Research Octane Number RON and the Motor Octane Number MON) of the product gasoline by as much as 10 units. This loss in octane number associated with desulfurization has a significant impact on the octane number of the refinery gasoline pool. The lower grade fuel probably needs more refining, such as isomerization, blending, or other refining, to produce higher octane fuel, adding significantly to production expenses.

Selective HDS to remove sulfur while minimizing hydrogenation of olefins and octane reduction by various techniques, such as selective catalysts, has been described in literature. For example, U.S. Pat. No. 4,132,632 (Yu et al.) and U.S. Pat. No. 4,140,626 (Bertolacini et al.), both assigned to Standard Oil Company (Indiana), disclose selective desulfurization of cracked naphthas by using specific catalysts having particular amounts of Group VI-B and VIII metals on magnesia containing support which is at least 70 wt % magnesium oxide and which may also contain other refractory inorganic oxides such as alumina, silica, or silica/alumina. U.S. Pat. Nos. 5,266,188 and 5,348,928 (Kukes et al.) assigned to Amoco Corporation disclose the use of novel catalysts comprising a hydrogenation component and a support component, for selective HDS. The hydrogenation component of these novel catalysts comprises a Group VI-B metal and a Group VIII metal, and the support component comprises from about 0.5 wt % to about 50 wt % of a magnesium component and from about 0.02 wt % to about 10 wt % of an alkali metal component.

U.S. Pat. No. 4,334,982 of Jacquin et al. assigned to Institut Francais du Petrole, disclosed the use of catalysts comprising cobalt and molybdenum or tungsten supported on low surface area low acidity oxide supports, the atomic ratio of cobalt to the total metals being greater than 0.55 in these catalysts, for selectively desulfurizing hydrocarbon cuts of high olefin content without significant loss in octane number. Use of alkali or alkaline earth metals in the catalyst was not suggested.

U.S. Pat. No. 5,340,466 of Dai et al., assigned to Texaco Inc., discloses the use of novel catalysts for the selective HDS of cracked naphtha comprising an alkali metal, a metal of Group VIII, and a metal of Group VI-B on "an inert support comprising 1–70% by weight of a hydrotalcite-like composition, and 30–99% by weight of inert metal-oxide type support such as silica, silica-alumina, alumina, magnesia, titania, etc, preferably alumina". U.S. Pat. No. 5,358,633 of Dai et al., assigned to Texaco Inc., discloses the use of transition alumina bearing Group VIII metal oxide and a Group VI-B metal oxide as selective HDS catalysts, the atom ratio of Group VIII metal to Group VI-B metal being 1–8 in these catalysts.

U.S. Pat. No. 5,423,976 of Sudhakar et al., assigned to Texaco Inc., discloses the use of a sulfided, carbon supported catalyst bearing (i) a non-noble Group VIII metal, (ii) a Group VI-B metal, and (iii) a metal of Group I-A, II-A, III-B, or a lanthanide, for HDS of cracked naphtha with minimum attendant hydrogenation of olefins that are present in the naphtha.

U.S. Pat. Nos. 5,286,373 and 5,423,975 of Sudhakar et al., assigned to Texaco Inc., disclose the use of highly deactivated hydrotreating catalysts and spent resid upgrading catalysts, without regenerating them, for the selective HDS of cracked naphthas with minimal olefin saturation and octane loss.

GB 2,225,731 discloses hydrotreating catalysts comprising Group VI and Group VIII metal hydrogenation components on a support which comprises magnesia and alumina in a homogeneous phase. The mole ratio of Mg to Al in these catalysts is 3–10:1. The catalyst is said to have comparable HDS activity to similar catalysts based on alumina.

Additional background may be noted from:
(i) U.S. Pat. No. 3,539,306 to Kyowa Chemical Industry Co. as assignee of Kumura et al.;
(ii) U.S. Pat. No. 3,650,704 to T. Kumura et al.;
(iii) Cavani et al., Anionic Clays with Hydrotalcite-like Structure as Precursors of Hydrogenation Catalysts, Mat. Res. Soc. Extended Abstracts" (EA-24)—Published by the Materials Research Society; and
(iv) O. Clause et al., Preparation and Thermal Reactivity of Nickel/Chromium and Nickel/Aluminum Hydrotalcite-type Precursors, Applied Catalysis 73 (1991) 217–236, Elsevier Science Publishers;
(v) Eur. Pat. Application 0 476 489 Al, to Haldor Topsoe A/S as assignee of E. G. Derouane et al.;
(vi) U.S. Pat. No. 3,705,097 issued 5 Dec. 1972 to Dow Chemical Co. as assignee of B. D. Head et al.;
(vii) U.S. Pat. No. 3,956,105 issued 11 May 1976 to Universal Oil Products as assignee of J. E. Conway.
(viii) U.S. Pat. No. 4,962,237 issued 9 Oct. 1990 to Dow Chemical Company as assignee of D. E. Laycock.
(ix) F. Cavani et al., Catalysis Today, 11(2), 1991.
(x) R. K. Sharma et al., Amer. Chem. Soc., Div. Fuel Chem., 36(2) (1991) 570–577.

It would be desirable to have an efficient process for removing sulfur from olefin containing fuel feedstocks, like naphtha, which minimizes loss of octane value using an inexpensive procedure under a wide range of condition. Such a process would represent a significant advance in the art and contribute to a cleaner environment. It would also allow the U.S. economy to be less dependent on foreign sources of oil.

Another advantage of the selective HDS is a low level of hydrogen consumption relative to normal HDS or hydrotreating operations. This is a result of the low level of hydrogenation due to low catalytic hydrogenation activity. This would save not only on the cost of hydrogen, but provide improved operation and control of the HDS reaction due to lower reaction heat generation compared with using fresh hydrotreating catalyst. If the process could be operated at lower pressures than standard HDS reactions, the process would be even more desirable commercially.

It has now been found that the "selective HDS" selectivity of the catalysts of U.S. Pat. No. 5,340,466 of Dai et al. an be improved significantly by using a catalyst support comprising essentially a hydrotalcite-like composition. It is an object of this invention to provide a novel catalyst and process for hydrotreating a charge cracked naphtha.

It is another object of the present invention to provide a novel catalyst and process that reduce cracked naphtha diene concentration significantly.

It is yet another object of the present invention to provide a novel catalyst and process that yields gasoline of less color and improved stability.

An additional advantage of the selective HDS of the present invention is the ability to operate the HDS process at lower pressures than standard HDS reactions. This provides a significant cost savings.

Other objects will be apparent to those skilled in the art.

STATEMENT OF THE INVENTION

In accordance with certain of its aspects this invention is directed to a process for treating a charge cracked naphtha containing olefinic components and undesired sulfur which comprises:

maintaining a bed of sulfided catalyst containing (i) a metal of non-noble Group VIII, and (ii) a metal of Group VI-B, and (iii) a metal of intentionally added Group I-A, on a support comprising essentially a hydrotalcite-like composition;

passing a charge cracked naphtha containing olefinic components and undesired sulfur into contact with said catalyst along with hydrogen;

maintaining said charge cracked naphtha containing olefinic components and undesired sulfur in contact with said catalyst and hydrogen at hydrodesulfurizing conditions thereby effecting hydrodesulfurization of said charge cracked naphtha containing olefinic components and undesired sulfur and forming a product stream of desulfurized naphtha containing a decreased content of sulfur; and recovering said product stream of cracked naphtha containing a decreased content of sulfur.

DESCRIPTION OF THE INVENTION

The charge hydrocarbon which may be treated by the process of this invention may include those which are commonly designated as cracked naphthas and include light cracked naphtha (boiling range of about $C_5$ to about 330° F.), a full range cracked naphtha (boiling range of about $C_5$ to about 420°F. or higher), and heavy cracked naphtha (boiling range of about 330° F., up to 500° F.), etc. These hydrocarbons which are in the gasoline boiling range, are typically recovered from thermal or catalytic cracking or coking operations and are generally passed to the gasoline pool. Examples include light, full range and heavy fluid catalytic cracked (FCC) naphthas, light, full range and heavy coker naphthas, and gasoline range hydrocarbon fractions from visbreaker operations.

Highly unsaturated hydrocarbon fractions boiling in the range of gasoline called "pyrolysis gasolines" are produced in petrochemical plants or refineries. Pyrolysis gasolines contain significant concentrations of olefins, and therefore are suitable feeds for the selective HDS process of the present invention. The hydrocarbon fractions called "steam cracking effluents" which contain significant concentrations of olefins and boil in gasoline range are also suitable to be treated using the novel catalysts and process of the present invention.

The cracked naphthas may also be supplemented with higher boiling range distillate feedstocks to form a mix feed for the process and catalysts of the present invention. Among the distillate feeds that are suitable for this purpose include, but are not limited to, light catalytic gas oils (LCGO), also called light catalytic cycle oils (LCCO), light coker gas oils (LKGO), straight run kerosine and light gas oils, etc. After the selective HDS of the mix feed, the naphtha portion can be separated by distillation, and directed into the gasoline pool.

The charge cracked naphtha hydrocarbons may be commonly characterized by the following properties given below in Table 1:

TABLE 1

| Condition/Property | Broad Range | Preferred Range |
|---|---|---|
| API Gravity° | 50–80 | 50–70 |
| Boiling Range °F. | | |
| Initial boiling point | 50–280 | 70–200 |
| 10 v % | 70–300 | 100–250 |
| 50 v % | 150–310 | 190–290 |
| 90 v % | 200–450 | 220–400 |
| End Point | 200–500 | 250–450 |
| Sulfur content (wppm) | 200–13,000 | 600–10,000 |
| Nitrogen content (wppm) | 0–500 | 5–200 |
| Olefin content (v %) | 5–60 | 10–50 |
| Aromatics content (v %) | 5–50 | 8–45 |
| Diene content (wt %) | 0.01–15 | 0.1–5 |
| Research Octane Number (RON) | 60–100 | 70–95 |

The novel catalysts of the present invention may also be advantageously utilized for selectively hydrodesulfurizing olefin containing naphtha boiling range hydrocarbon streams which are derived from coal liquefaction, shale oils, sand oils or any other type of synthetic carbonaceous fuels.

The novel catalysts of the present invention may also be advantageously utilized for hydrodesulfurizing straight run heavy naphtha, and middle distillate feedstocks such as light gas oils, and light and heavy kerosines, regardless of the origin of those middle distillates. For example, light gas oils produced in delayed cokers, fluid catalytic crackers, mild hydrocrackers, or straight run from crude, can be hydrodesulfurized using the catalysts of the present invention. In such a hydrotreating or hydrodesulfurization process for the HDS of middle distillates utilizing the novel catalysts of the present invention, due to their diminished hydrogenation activity, the hydrogen consumption is anticipated to be significantly lower than that with conventional alumina supported Co—Mo or Ni—Mo hydrotreating catalysts, and therefore saves great deal of cost in desulfurizing these feed streams.

The novel catalysts of the present invention may also be advantageously utilized for hydrodesulfurization in "blocked operation" mode. For example, a hydrotreating reactor containing the novel catalyst of the present invention can be used to selectively desulfurize cracked naphtha for a certain period of time, then the operation can be switched to desulfurize a middle distillate such as a light gas oil for a certain period of time, and then switched back again to selectively desulfurize cracked naphtha.

The process and the novel catalyst compositions of the present invention may also be utilized for selectively hydrogenating dienes to mono-olefins under suitable reaction conditions. Use of these catalysts for this particular application would be as a guard bed catalyst in any catalytic process that is affected adversely by the presence of diene impurities in the feed for that catalytic process. Examples of such catalytic processes which may benefit by the novel catalyst compositions of the present invention include paraffin and olefin isomerization processes, olefin skeletal isomerization processes, etherification processes which involve reaction of branched olefin containing streams with alcohols, and the like.

We have noted from our experience that the novel catalysts and the process of the present invention are excellent for producing fuels which are almost "water white", and therefore will be useful for producing gasoline, kerosine or diesel fuel having significantly less color.

Since a substantial portion of the original olefin content is not saturated in the selective HDS process of the present invention, some of these olefins which are left behind react with the hydrogen sulfide formed in the hydrodesulfurization reaction, to form mercaptans. This is called recombination reaction. These mercaptans formed by the recombination reaction and existing in the product desulfurized naphtha may be removed or converted to disulfides by subsequently subjecting the product naphtha to a known mercaptan removal or oxidation process to remove the mercaptans and get a desulfurized naphtha product of lesser sulfur content. Alternatively, the disulfides can be left behind in the product if the total sulfur concentration meets the specifications. There are several mercaptan removal and oxidation processes, such as the Merox process, known in the literature.

In practice of the process of this invention for selective HDS of cracked naphtha, the charge cracked naphtha is admitted to the catalyst bed and maintained therein at the conditions following, listed in Table 2:

TABLE 2

| Condition | Broad Range | Preferred Range | Typical |
|---|---|---|---|
| Temperature °F. | 400–750 | 500–700 | 550 |
| Total Pressure (psig) | 200–1000 | 250–600 | 400 |
| Hydrogen feed rate (SCFB) | 100–6,000 | 500–4,000 | 2,000 |
| Liquid Hourly Space Velocity (hr$^{-1}$) | 1–15 | 2–10 | 4 |
| Hydrogen Purity (v %) | 60–100 | 80–99 | 95 |

The process of the present invention may be effected in any type of reactor system such as fixed bed reactor system, ebullated bed reactor system, fluidized bed reactor system, moving bed, slurry reactor system, and the like. In the case of fixed bed reactor system, the reaction zone may consist of one or more fixed bed reactors and may comprise a plurality of catalyst beds. It is preferred to use extrudates, pellets, pills, spheres or granules of the catalyst in a fixed bed reactor system, preferably under conditions where substantial feed vaporization occurs. In the case of extrudates, shaped extrudates such as the multi-lobed shapes may provide some advantage. The finished catalysts of the present invention can be in any physical form described above, as well as powder.

The catalyst is formed on a support which comprises essentially a hydrotalcite-like composition of the formula $$[X_aY_b(OH)_c]_n[A]_{d.e.H_2O}$$

a=1–10
b=1–10
c=2 (a+b)=4–40
A is an anion of formal negative charge n
n=an integer 1–4
d is the formal positive charge of $[X_aY_b(OH)_c]$
e=1–10
"X" is a divalent metal
"Y" is a trivalent metal of Group III-A or Group VI-B or non-noble Group VIII of the Periodic Table,
subject to the qualification that when one of d or n is an integral multiple of the other, they are both reduced to lowest integral terms.

The metal X may be a Group II-A metal such as beryllium (Be), magnesium (Mg), calcium (Ca), strontium (Sr), barium (Ba), or radium (Ra). The preferred metal is magnesium (Mg). More than one metal X may be present.

The metal Y may be boron (B), aluminum (Al), gallium (Ga), indium (In), or thallium (Tl) of Group III, or iron Fe, cobalt Co, or nickel Ni of non-noble Group VIII, or chromium Cr, molybdenum Mo, or tungsten W of Group VI-B. The preferred metal is aluminum (Al). More than one metal Y may be present.

a may be 1–10, preferably 3–6, say 4.5.
b may be 1–10, preferably 1–3, say 2.
c may be 4–40, preferably 10–16, say 13.
n may be an integer 1–4, preferably 1–2, say 2.
d may be 1–4, preferably 1.
e may be 1–10, preferably 3–4, say 3.5.

"A" may be an anion such as $CO_3^=$, halogen eg. Cl$^-$, acetate $C_2H_3O_2^-$, oxalate $HC_2O_4^-$ or $C_2O_4^=$, $NO_3^-$, $SO_4^=$, or $ClO_4^-$. The preferred anion may be $CO_3^=$.

Illustrative hydrotalcite-like (HTlc) compositions are those noted in the following Table 3. The first listed composition is hydrotalcite (HT) itself. It is available under the designation DHT-4A.

TABLE 3

$[Mg_{4.5}Al_2(OH)_{13}][CO_3].3.5H_2O$
$[Mg_6Al_2(OH)_{16}][CO_3].4H_2O$
$[Mg_6Al_2(OH)_{16}][NO_3].4H_2O$
$[Ca_6Al_2(OH)_{16}][SO_4].4H_2O$
$[Zn_3Cr(OH)_8][NO_3].4H_2O$
$[Ni_5Al_2(OH)_{14}][NO_3].4H_2O$
$[Mg_4Fe(OH)_{10}][NO_3].4H_2O$
$[NiMg_5Al_2(OH)_{16}][CO_3].4H_2O$

Hydrotalcite $[Mg_6Al_2(OH)_{16}CO_3.4H_2O]$ is a hydroxycarbonate of magnesium and aluminum and occurs naturally in the Urals of Russia and also in Snarum, Norway. In 1966 Kyowa Chemical Industry Co., Ltd. succeeded in the world's first industrial synthesis of hydrotalcite. (U.S. Pat. Nos. 3,539,306 and 3,650,704). DHT-4A $[Mg_{4.5}Al_2(OH)_{13}CO_3.3.5H_2O]$ is a hydrotalcite-like compound. The first papers in the literature referring to hydrotalcite-like compounds appeared in 1971, written by Miyata et al., dealing with basic catalysts (S. Miyata et al., Nippon Kagaku Zasshi, 92 (1971) 514) and in 1977 by Miyata (S. Miyata, Kogaku Gijutsushi Mol, 15 (10) (1977) 32 and 15 (3) 1971 31).

The preparation, properties and applications of hydrotalcite-type anionic clays are reviewed by F. Cavani et al. in CATALYSIS TODAY, Vol. 11, No. 2, 1991. The natural product of calcination or activation in inert gas of a HTlc is believed to be a spinel, but this occurs at a relatively high temperature. In the range between the temperature at which HTlc decomposition commences (between 572°F. and 752° F.) and that of spinel formation (1652° F.), a series of metastable phases form, both crystalline and amorphous. Therefore, the surface area, pore volume, and structure depend on the temperature of calcination. Upon calcination, the crystal structure of DHT-4A for example, is decomposed at about 660°F. when water and carbon dioxide evolved from the structure, and a $MgO-Al_2O_3$ solid solution of formula 4.5 $MgO.Al_2O_3$ is formed. This solid solution is stable up to 1472° F. MgO and $MgAl_2O_4$ are formed at about 1652° F. On the other hand, the solid solution calcined at less than 1472°F. can be restored to the original structure by hydration.

The most interesting properties of the calcined HTlc are 1) high surface area, 2) basic properties, and 3) formation of homogeneous mixtures of oxides with very small crystal size. Miyata et al., showed that there is a maximum in the number of basic sites when the HTlc is calcined at 932° F. Nakatsuka et al. examined the effect of the Mg/Al ratio in the HT on the basic strength and the amount of basic sites. (Bull. Chem. Soc. Japan, 52 (1979) 2449). The number of basic sites increased with Mg/Al ratio, while the number of acid sites decreased; however the compound with ratio MgO/$Al_2O_3$ of 5.23 exhibited the greatest number of basic sites per unit of surface area. The HTlc and the calcined HTlc have found applications in basic catalysis, hydrogenation of nitrobenzene, oxidation reaction, and support for Ziegler-Natta catalysts. U.S. Pat. No. 4,962,237 discloses a catalytic process for the preparation of polyols using the calcined DHT-4A.

The compositions may be readily available commercially from Kyowa Chemical Industry Co. Ltd. of Kagawa, Japan. The preferred composition is marketed under the trademark DHT-4A having the formula:

$$Mg_{4.5}Al_2(OH)_{13}CO_3.3.5H_2O$$

An especially preferred hydrotalcite product suitable as the catalyst support for the novel catalysts of the present invention is a highly water dispersible and easily extrudable form of hydrotalcite that is commercially available from LaRoche Industries Inc., under the trade name "LaRoche HTC". According to the manufacturer's specifications, this product contains 0.2 wt % $Na_2O$, 0.05 wt % $SiO_2$. 0.06 wt % $Fe_2O_3$, and 0.4 wt % CaO as impurities, and develops a high B.E.T. (Brunauer-Emmett-Taylor) surface area of about 250 $m^2/g$ on calcination at 400° C.

The catalyst support may be formed by mixing the hydrotalcite with water to form a paste and after mulling, the mixture is cast or extruded to form cylinders of a diameter of about 0.8–4.0 mm, say 1.5 mm and length of 2.5–15 mm, say 3.8 mm. The cross-section of the particles is preferably a trilobar. Some hydrotalcite preparations need the addition of dilute acids to make them water dispersible in order to make them easily extrudable. In general, the hydrotalcite-like compositions may be cast or extruded or pelletized using any method known to those in the art, when using them as catalyst supports for the catalysts of the present invention. Inert inorganic oxides may also be used as binders to aid in casting or extrusion. Examples of these inorganic oxides include alumina, silica, titania, silica-alumina, clays such as montmorillonite etc., carbon blacks, or mixtures thereof. In any case, the proportion or all such binders in the finished catalyst support must not exceed 20% by weight.

The particles are dried at 110°C.–250° C., preferably 120°C.–200° C., say 120°C. for 10–30, preferably 12–24, say 16 hours and thereafter optionally calcined at 400°C.–650° C., preferably 450°C.–550° C., say 500° C. for 0.2–3 hours, preferably 0.4–2 hours, say 0.5 hours in air or inert atmosphere.

The so-formed support composition is typically characterized by the properties following, listed in Table 4:

TABLE 4

| Condition/Property | Broad Range | Preferred Range | Typical |
|---|---|---|---|
| Surface Area by Nitrogen B.E.T., $m^2/g$ | 20–350 | 100–300 | 200 |
| Total Pore Volume (TPV) for $N_2$, cc/g | 0.2–1.5 | 0.4–1.0 | 0.7 |
| Particle Diameter, mm | 0.8–4 | 1–3 | 1.5 |

Preparation of the catalyst of this invention is effected by contacting the support with preferably aqueous solutions of Group I-A, Group VI-B and non-noble Group VIII metal, or they may be added dry or in the form of an aqueous or non-aqueous solution or suspension. The non-noble Group VIII metal may be iron Fe, cobalt Co, or nickel Ni, preferably cobalt; and the metal may be added, in solution in amount sufficient to fill the pores of the support—preferably as an aqueous solution of a soluble cobalt salt such as the acetate, nitrate, etc. The Group VI-B metal may be molybdenum Mo, or tungsten W, preferably molybdenum, typically as the acetate, oxide, chloride, or carbonyl. Ammonium molybdate or ammonium tetrathiomolybdate may be employed typically in aqueous solution.

The metals may be added simultaneously or sequentially in any order, by any known deposition technique known to those skilled in the art, such as equilibrium adsorption, incipient wetness impregnation, pore filling, ion exchange, etc. After addition, the support bearing the metals is dried at 110°C.–250° C., preferably 120°C.–200° C., say 120° C. for 10–30, preferably 12–24, say 16 hours and thereafter optionally calcined at 400°C.–650° C., preferably 450°C.–550° C., say 500° C. for 0.2–3 hours, preferably 0.4–2 hours, say 0.5 hours in air or inert atmosphere. If the metals are added sequentially, the support bearing the metal(s) may be dried and optionally calcined after each deposition step before the next metal is added.

It is a feature of the catalyst of this invention that it contains intentionally added alkali metals of Group I-A of the Periodic Table. Although the alkali metal may be sodium, lithium, cesium, or rubidium, it is preferably potassium. More than one alkali metal may be present in the catalyst. The alkali metal may be added as a soluble salt such as the acetate, nitrate, carbonate, oxalate, sulfide, or the hydroxide. Preferably the amount of intentionally added alkali metal may be 0.2–10 wt %, typically 0.5–5 wt %, say 1 wt % of total catalyst. In general, any known inorganic, organic or organometallic compounds of the Group I-A metal can be used as precursors for the Group I-A metal in the final catalyst. Group II-A alkaline earth and rare earth lanthanide metals are also anticipated to be useful in improving the selectivity of these catalysts, but the Group I-A metals are preferred.

The alkali metal may be added at any time during preparation of the catalyst—either with one or both of the metals of Group VIII and VI-B or before or after. The catalyst support bearing the metals of Group VIII, VI-B, and I-A is dried at 110°C.–250° C., preferably 120°C.–200° C., say 120° C. for 10–30, preferably 12–24, say 16 hours and thereafter optionally calcined at 400°C.–650° C., preferably 450°C.–550°C., say 500°C. for 0.2–3 hours, preferably 0.4–2 hours, say 0.5 hours in air or inert atmosphere.

It should be noted here that these metals referred to above as "metals", usually exist as some compound(s) of the metal, such as the metal oxide, nitrate, sulfate, carbonate, ammonium salt, chloride etc. depending on the metal compound used to prepare the catalyst and the temperature at which the material is treated, and should not be confused with elemental metals. The weight % specification, however, is based on the calculation as "metal", and not as "oxide" or any other metal compound.

The Group VI-B metal may be tungsten or more preferably molybdenum—present in the final catalyst in amount of 0.1–30wt %, preferably 0.5–20wt % say 6wt % for Mo and preferably 12wt % for W. In general, any known inorganic, organic or organometallic compounds of the Group VI-B metal can be used as precursors for the Group VI-B metal in the final catalyst. Suitable compounds include, but are not limited to the oxide, acetate, naphthenate, dialkyldithiocarbamate, ammonium salts such as ammonium heptamolybdate, ammonium tetrathiomolybdate, or ammonium metatungstate, molybdo and tungsto-phosphoric acids, carbonyl compounds, and chloride of the Group VI-B metal. Molybdenum is the preferred Group VI-B metal. The catalyst may contain more than one of the Group VI-B metals. Compounds such as sodium or potassium molybdate may be used as the precursor for molybdenum, with the added advantage in this case that the Group I-A metal is also incorporated into the catalyst at the same time.

The non-noble Group VIII metal may preferably be nickel Ni or more preferably cobalt Co—present in the final catalyst in amount of 0.1–15wt %, preferably 0.5–10 wt %, say 2wt %. In general, any known inorganic, organic or organometallic compounds of the Group VIII metal can be used as precursors for the Group VIII metal in the final catalyst. Suitable compounds include, but are not limited to the nitrate, sulfate, acetate, naphthenate, dialkyldithiocarbamate, ammonium salts, carbonyl compounds, sulfate, sulfamate, and chloride of the Group VIII metal. Cobalt is the preferred Group VIII metal. The catalyst may contain more than one of the Group VIII metals.

The Group VI-B metal may be loaded onto the catalyst support from a preferably aqueous solution of ammonium heptamolybdate or of ammonium metatungstate. The Group VIII metal may be loaded onto the catalyst support from a preferably aqueous solution of nickel nitrate or of cobalt nitrate. However, in general, any known and easily available inorganic, organic or organometallic compounds of the Group VI-B and Group VIII metals may be used as precursors for the Group VI-B and Group VIII metals in the final catalyst.

When aqueous solutions are used to deposit the catalytic metals either individually or more than one at the same time, the pH values of the aqueous solutions may be adjusted to desired values before metals deposition. As is well known to those skilled in the art, the pH of an aqueous solution containing catalytic metals may need adjusting to a desired value before it is used for metals deposition on a catalyst support.

The catalysts may also be prepared by solid state synthesis techniques such as, for example, grinding together the support and the metal compounds in a single step or in multiple steps, with suitable heat treatments, followed by subsequent extrusion or pelletizing. It is to be noted that in the as-prepared catalysts, the catalytic metals exist as oxides or as partially decomposed or partially reacted metal compounds.

In an especially preferred embodiment, the catalyst support comprised essentially of the hydrotalcite-like composition in the form of a fine powder, is contacted with an aqueous solution containing a soluble compound of the Group VIII metal, say cobalt nitrate, and a soluble compound of the Group VI-B metal, say ammonium heptamolybdate, and a soluble compound of the Group I-A metal, say potassium nitrate. Organic binders known to those skilled in the art such as polyvinyl alcohol, stearic acid, starch etc. may be added to the mixture if needed to help make the material extrudable. Inorganic binders known to those skilled in the art such as highly dispersible aluminas, silica, titania, clay materials may also be added to help make the material extrudable. Both organic and inorganic binders together may also be used. The resulting material is mulled thoroughly to form an extrudable mass, and then it is extruded into extrudates of the desired shape, say, trilobar shape. The organic binder materials may later be eliminated by suitably calcining the extruded material. Inorganic binders stay in the final catalyst. However, the total amount of all the inorganic binders in the final catalyst should be limited to 20wt % of the support weight. It is preferable, however, to use a preparation of hydrotalcite-like composition which is extrudable after metals addition without the need for any binding material.

The finished catalyst, so prepared, contains the wt % metal, based on final catalyst weight shown in Table 5:

TABLE 5

| Component | Broad Range | Preferred Range | Typical |
|---|---|---|---|
| Intentionally added Group I-A | 0.2–10 | 0.5–5 | 1, for K |
| Group VI-B | 0.1–30 | 0.5–20 | 6, for Mo |
| Group VIII | 0.1–15 | 0.5–10 | 2, for Co |
| Support Comprising Essentially of a Hydrotalcite-like Composition | At least 80% of the balance | | |

The desired selective HDS of the charge cracked naphtha according to this invention is accomplished by use of a catalyst prepared from a support comprising essentially a hydrotalcite-like composition, which has deposited thereon 0.1–30 wt % of Group VI-B metal, 0.1–15 wt % of non-noble Group VIII metal, and 0.2–10 wt % of one or more intentionally added alkali metals, based on the final catalyst weight. The catalysts of the present invention may also contain additional promoters known to those skilled in the art of hydrotreating, such as copper, phosphorus, boron or fluoride, at 0.01% to 4% by weight, calculated as elemental copper, phosphorus, boron or fluorine respectively, based on the final catalyst weight.

The catalyst so prepared may then be sulfided to a significant extent, preferably after loading into the hydrodesulfurization reactor. The catalyst sulfiding may be accomplished using any method known in the art, such as, for example, heating the catalyst in a stream of hydrogen sulfide in hydrogen or by flowing an easily decomposable sulfur compound such as carbon disulfide, di-t-nonylpolysulfide (TNPS) or dimethyl disulfide with or without a hydrocarbon solvent, over the catalyst at elevated temperatures up to, but not limited to 500° C. at atmospheric or higher pressures, in the presence of hydrogen gas for 2–24 hours, say 3 hours.

Alternatively, the catalyst sulfiding may also be effected by the sulfur compounds present in the hydrocarbon charge itself which is being hydrotreated. The catalyst may also be presulfided outside the reactor, suitably passivated and then loaded into the reactor.

Ex-situ sulfiding may be accomplished using any of the known techniques described in literature. If a sufficient amount of sulfur is incorporated into the catalyst using one of these ex-situ presulfiding techniques, activation of the catalyst might be accomplished by heating the catalyst in hydrogen flow in the reactor itself.

The product of the selective HDS is substantially desulfurized naphtha retaining high olefins content, and sulfur products consisting essentially of hydrogen sulfide. Generally, the desulfurized naphtha has a substantially reduced concentration, generally less than about 20% and preferably less than about 10% of the original thiohydrocarbon concentration present in the charge naphtha feedstock. The olefin content in the product desulfurized naphtha is generally at least about 50 v % and typically about 50–80 v % or higher, of the olefin content originally present in the naphtha feedstock. The desulfurized naphtha thereby retains a significant octane value as compared with the original octane value of the naphtha.

The hydrogen sulfide may be removed from the product desulfurized naphtha using any effective procedure, including those known in the art. Typical hydrogen sulfide removing procedures include, among others: gas sparging, with, for example, hydrogen or nitrogen; caustic scrubbing; amine treating; sorption; flashing, or the like, in addition to the conventional gas-liquid separation.

Desulfurized naphtha containing very low sulfur content can be produced by the process of the present invention. Depending upon the initial sulfur content, feedstock, HDS conditions and other factors influencing sulfur removal, the desulfurized naphtha will generally have less than about 300, preferably less than about 200, and most preferably less than about 125 weight parts per million (wppm) sulfur.

Most of the diolefins and other gum forming components present in the charge naphtha are also substantially eliminated during the process of this invention, thereby increasing the storage stability of the product desulfurized naphtha. In most cases, the product desulfurized naphtha may be water-white in color.

DESCRIPTION OF PREFERRED EMBODIMENTS

Practice of the process of this invention will be apparent to those skilled in the art from the following wherein all parts are parts by weight unless otherwise stated. An asterisk (*) indicates a control example.

EXAMPLE I* (COMPARATIVE EXAMPLE)

In this Control Example, the catalyst was the same as "EXAMPLE II" of the U.S. Pat. No. 5,340,466. The detailed procedure for its preparation is available in U.S. Pat. No. 5,340,466 incorporated herein by reference in its entirety. The support used to prepare this catalyst had a B.E.T. surface area of 330 $m^2/g$ and a total pore volume by mercury porosimetry of 0.72 cc/g. The support contained 16 wt % MgO and 84 wt % $Al_2O_3$. The final catalyst had metal loadings of 3 wt % Co, 15 wt % Mo, and 2.3 wt % K. This particular catalyst was mentioned as the best mode of the process of invention of U.S. Pat. No. 5,340,466.

EXAMPLES II* (COMPARATIVE EXAMPLE)

In this Control Example, the catalyst was the same as "EXAMPLE III" of the U.S. Pat. No. 5,340,466. The detailed procedure for its preparation is available in U.S. Pat. No. 5,340,466. The support used to prepare this catalyst had a B.E.T. surface area of 318 $m^2/g$ and a total pore volume by mercury porosimetry of 0.92 cc/g. The support contained 32 wt % MgO and 68 wt % $Al_2O_3$. The final catalyst had metal loadings of 3 wt % Co, 15 wt % Mo, and 2.3 wt % K.

EXAMPLE III* (COMPARATIVE EXAMPLE)

In this Control Example, the catalyst was a stacked bed combination of equal volumes of two commercially available alumina supported Co-Mo catalysts. The catalysts were C-447 and C-444, both from the Criterion Catalyst Company. The stacked bed was arranged in such a way that the C-447 catalyst is exposed to the naphtha first.

EXAMPLE IV* (COMPARATIVE EXAMPLE)

In this Control Example, the catalyst was prepared by impregnating to incipient wetness 80 parts of $\frac{1}{16}$ inch diameter gamma alumina extrudates AL-3952 from Engelhard Corporation, with 55 parts of deionized water containing 2.5 parts of anhydrous potassium carbonate. After heating in air at 130° C. for 24 hours and cooling to ambient temperature, one half of the material was impregnated to incipient wetness by contact with 24 parts of deionized water containing 13.5 parts of cobalt (II) nitrate.$6H_2O$ and 3.6 parts of ammonium heptamolybdate.$4H_2O$. The resulting material was heated in air at 200° C. for 65 hours and was cooled to ambient temperature. The final catalyst contains nominally 4 wt % Mo, 2 wt % K, and 6 wt % Co.

EXAMPLE V (INVENTION)

In this invention Example, the catalyst support used was the hydrotalcite that is commercially available from LaRoche Industries Inc., under the trade name "LaRoche HTC". According to the manufacturer's specifications, this product $Mg_6Al_2(OH)_{16}CO_3.4H_2O$, shows an X-ray diffraction phase type of a hydrotalcite, and contains 0.2 wt % $Na_2O$, 0.05 wt % $SiO_2$, 0.06 wt % $Fe_2O_3$, and 0.4 wt % CaO as impurities, and develops a high B.E.T. (Brunauer-Emmett-Taylor) surface area of about 250 $m^2/g$ on calcination at 400° C.

The following procedure was used to prepare the catalyst of Example V. 18.8 pats of ammonium heptamolybdate.$4H_2O$ and 2.6 parts of anhydrous potassium carbonate were dissolved in 65 parts of deionized water at 25° C. In a separate beaker, 15.7 parts of cobalt (II) nitrate.$6H_2O$ was dissolved in 30 parts of water. 150 parts of hydrotalcite was placed in a mixer-muller. While mixing the hydrotalcite powder in the mixer-muller, both the solutions were added to the hydrotalcite powder in the mixer-muller simultaneously and slowly, and the mixing continued for an additional 15 minutes. An additional 24 parts of water was added to the composite to obtain an extrudable paste. Then the paste was extruded with the help of a screw extruder into $\frac{1}{25}$ inch extrudates. The material was dried overnight at 125° C. in partial vacuum with nitrogen bleed, and then dried again in a circulating air oven at 200° C. for 38 hours. The dried extrudates were broken into small pieces of approximately ¼ inch length.

EXAMPLE VI (INVENTION)

In this invention Example also, the catalyst support used was the hydrotalcite that is commercially available from LaRoche Industries Inc., under the trade name "LaRoche HTC".

The following procedure was used to prepare the catalyst of Example VI. 5.7 parts of ammonium heptamolybdate.$4H_2O$ and 1.4 parts of anhydrous potassium carbonate were dissolved in 55 parts of deionized water at 25° C. In a separate beaker, 5.1 parts of cobalt (II) nitrate.$6H_2O$ was dissolved in 24 parts of water, and this solution was added to the first solution containing the ammonium molybdate and potassium carbonate while stirring. 90 parts of hydrotalcite was placed in a mixer-muller. While mixing the hydrotalcite powder in the mixer-muller, the solution was added to the hydrotalcite powder slowly, and the mixing continued for an additional 15 minutes. Then the paste was extruded with the help of a screw extruder into $\frac{1}{25}$ inch extrudates. The material was dried overnight at 200° C. in air for 38 hours. The extrudates were broken into small pieces of approximately ¼ inch length, and were calcined in a flow of air at 500° C. for 3 hours. Elemental analysis for metal loadings indicated that the final catalyst contained 3.61 wt % Mo, 1.16 wt % Co, and 0.65 wt % K.

CATALYST EVALUATION

The above catalysts were evaluated for their simultaneous hydrodesulfurization (HDS) and olefin hydrogenation (HYD) activities in a conventional hydrotreating reactor system using techniques well known to those familiar with the art. In a typical experiment, 20 or 25 cc of the catalyst is loaded into a 50 cm long stainless steel hydrotreating reactor of 21 mm inner diameter. It is heated by a three or four zone furnace, the temperature of each zone controllable independently. A 6.4 mm O.D. stainless steel thermowell is placed axially throughout the length of the reactor, facilitating precise measurement of the temperature inside the catalyst bed at any point.

All the catalysts were presulfided before contacting the cracked naphtha feed. After purging off oxygen from the reactor, 200 cc/min of a sulfiding gas consisting of 10 v % $H_2S$ in hydrogen is passed through the catalyst bed for 15 min at room temperature at 1 atmosphere pressure. With the sulfiding gas flowing, the temperature of the catalyst bed is increased at 1° C./min to 350° C., and kept at the sulfidation temperature of 350° C. for 3 hours. The temperature of the reactor is then lowered to the reaction temperature, with the sulfiding gas still flowing. At this point, a back pressure of about 100 psig is applied to the reactor, and the cracked naphtha flow is started at the desired flow rate. Once the liquid had passed beyond the catalyst bed, the flow of the sulfiding gas is cut off, the flow of pure hydrogen gas is started at the desired rate, and the reactor pressure is increased to 300 psig. The actual hydrotreating reaction is considered to have started at this point in time. The reactor effluent is condensed by passing it through a condenser maintained at about 5° C. in front of a high pressure gas liquid separator.

For each reaction condition, after about 20 hours on stream, which was found be sufficient to attain steady state activities under the reaction conditions employed, 3 liquid product samples were collected for analysis at one hour intervals. One large sample was collected for measuring the octane numbers of the hydrotreated product at 5–8 hours on stream.

The catalysts were evaluated for processing full range fluid catalytic cracked naphthas having the properties and composition shown in Table 6. Even though full range fluid catalytic cracked naphtha was used to show the advantages of this invention, as described earlier, the present invention is applicable for processing other kinds of naphthas such as coker naphthas and, in general, for any naphthas which contain >5 v % olefin concentration.

TABLE 6

Properties of Full Range FC Cracked Naphthas

| PROPERTY | VALUE | | |
|---|---|---|---|
| | Feed 1 | Feed 2 | Feed 3 |
| API Gravity | 56.7° | 58° | 51.4° |
| Boiling Point range by D86 Distillation | | | |
| Initial Boiling Point (IBP) | 91° F. | 92° F. | 109° F. |
| 10% | 131° F. | 137° F. | 162° F. |
| 20% | 145° F. | | 177° F. |
| 30% | 161° F. | | 195° F. |
| 40% | 183° F. | | 218° F. |
| 50% | 210° F. | 219° F. | 245° F. |
| 60% | 242° F. | | 275° F. |
| 70% | 275° F. | | 302° F. |
| 80% | 309° F. | | 330° F. |
| 90% | 346° F. | 368° F. | 357° F. |
| End Point (EP) | 416° F. | 432° F. | 405° F. |
| Sulfur Content, wppm | 1100 | 1450 | 1600 |
| Nitrogen Content, wppm | 29 | 20 | <20 |

TABLE 6-continued

Properties of Full Range FC Cracked Naphthas

| PROPERTY | VALUE | | |
|---|---|---|---|
| | Feed 1 | Feed 2 | Feed 3 |
| Research Octane Number, RON | 95.0 | 93.0 | 91.5 |
| Motor Octane Number, MON | 82.0 | 80.5 | 80.9 |
| Olefin Content, v % | 27.4 | 27.5 | 27.8 |
| Aromatics Content, v % | 31.5 | 29 | 31.5 |

The sulfur concentrations of the feed and product samples were determined by the X-ray fluorescence (XRF) technique ASTM D2622. The product samples were carefully sparged ultrasonically at about 5° C. to remove the dissolved $H_2S$ prior to the XRF measurement. The concentration of olefins as volume % in the feed and product samples were measured by PIONA (Paraffins, Isoparaffins, Olefins, Naphthenes, Aromatics) technique using Gas Chromatography. The PIONA technique is widely used in the petroleum industry for this purpose.

The experimental results of various catalyst evaluations for the hydrodesulfurization of full range fluid catalytic (FC) cracked naphtha which led us to the present invention are presented in Table 7. Presented in Table 7 are the catalyst, catalyst description, feed used (identification from Table 6), total pressure in the reactor in psi, Liquid Hourly Space Velocity (LHSV), hydrogen flow rate in standard cubic feet per barrel (SCFB), temperature of the catalyst bed in °C., product sulfur concentration in wppm, % HDS (hydrodesulfurization) from X-ray fluorescence D2622, % HYD (olefins hydrogenated) during the catalytic process measured by the PIONA technique, and the "Selectivity Factor", defined as the ratio of Log[fraction sulfur remaining] to Log[fraction olefins remaining], which is a function of % HDS level. It should be noted here that all the results presented in Table 7 are based on "equal catalyst volume basis", and also that all the catalysts were pre-sulfided in situ at 350° C. for 3 hours using a sulfiding gas mixture consisting of 10 v % $H_2S$ in hydrogen, prior to starting the run.

TABLE 7

| Catalyst of Example | Catalyst Description | Feed | Total Pressure (psi) | LHSV (hr$^{-1}$) | Hydrogen Flow (SCFB) | Temp °C. | Prod. Sulfur (wppm) | % HDS | % HYD of Olefins | Selectivity Factor |
|---|---|---|---|---|---|---|---|---|---|---|
| I* Control | Co—Mo—K/ [Hydrotalcite + Alumina] Example II of U.S. Pat. No. 5,340,466 | Feed #2 in Table 6 | 300 400 300 | 2.0 4.0 4.0 | 2000 2000 2000 | 260 290 300 | 171 80 59 | 88.2 94.5 95.9 | 55.0 84.7 79.3 | 2.7 1.5 2.0 |
| II* Control | Co—Mo—K/ [Hydrotalcite + Alumina] Example III of U.S. Pat. No. 5,340,466 | Feed #1 in Table 6 | 300 300 300 | 4.0 4.0 4.0 | 2000 2000 2000 | 285 300 315 | 155 92 62 | 85.9 91.6 94.4 | 34.3 35.9 51.8 | 4.7 5.6 |
| III* Control | Stacked bed of C447/C444 catalysts from Criterion Co. | Feed #3 in Table 6 | 300 300 300 | 4.0 4.0 4.0 | 2000 2000 2000 | 265 275 290 | 345 181 102 | 78.4 88.7 93.6 | 29.8 39.1 48.1 | 4.3 4.5 4.2 |
| IV* Control | Co—Mo—K/ Gamma Alumina | Feed #3 in Table 6 | 300 300 300 | 4.0 4.0 4.0 | 2000 2000 2000 | 270 285 300 | 265 164 100 | 83.4 89.8 93.8 | 31.2 40.3 51.0 | 4.8 4.4 3.9 |
| V Invention | Co—Mo—K/ Hydrotalcite (Invention) | Feed #3 in Table 6 | 300 300 300 | 4.0 4.0 4.0 | 2000 2000 2000 | 280 295 305 | 237 186 155 | 85.2 88.4 90.3 | 18.6 21.8 22.6 | 9.3 8.8 9.1 |

TABLE 7-continued

| Catalyst of Example | Catalyst Description | Feed | Total Pressure (psi) | LHSV (hr$^{-1}$) | Hydrogen Flow (SCFB) | Temp °C. | Prod. Sulfur (wppm) | % HDS | % HYD of Olefins | Selectivity Factor |
|---|---|---|---|---|---|---|---|---|---|---|
| VI Invention | Co—Mo—K/ Hydrotalcite (Invention) | Feed #3 in Table 6 | 300 300 300 | 4.0 4.0 4.0 | 2000 2000 2000 | 280 295 305 | 273 215 176 | 82.9 86.6 89.0 | 21.2 19.9 20.1 | 7.4 8.8 9.8 |

A careful observation of the results presented in Table 7 reveal the following:

1. The catalysts of the present invention are significantly more selective for the selective HDS of fluid catalytically cracked naphtha when compared to the earlier art catalysts of U.S. Pat. No. 5,340,466 which are based on supports made up of hydrotalcite and gamma alumina which contained up to 70% hydrotalcite in the support. At similar % HDS level, the catalysts of the present invention saturate significantly less olefins compared to the earlier art catalysts, which will translate into significantly less loss in the octane value.
2. The catalysts of the present invention saturated (by hydrogenation) only about 20% of the total olefins originally present in the example cracked naphtha at a high HDS level of about 90%. This observation indicates that with the help of the catalysts of the present invention, it is possible to deeply hydrodesulfurize cracked naphthas to produce gasoline of very low sulfur content, without losing significant octane value.
3. The catalysts of the present invention are significantly more selective for the selective HDS of fluid catalytically cracked naphtha when compared to the commercially available alumina supported Co-Mo catalysts, at similar % HDS levels.
4. The catalysts of the present invention are significantly more selective for the selective HDS of fluid catalytically cracked naphtha when compared to the alkali promoted alumina supported Co-Mo catalyst, indicating that the alkali metals do not significantly influence (or suppress) the hydrogenation characteristics of alumina supported Co—Mo catalysts, and also that the effect of alkali metal on the activity and selectivity of a catalyst depends on the catalyst support.
5. The Best Mode of the instant invention is believed to be that of Example V or of Example VI, where the performance is about the same for the selective HDS of fluid catalytically cracked naphtha.

Although this invention has been illustrated by reference to specific embodiments, it will be apparent to those skilled in the art that various changes and modifications may be made which clearly fall within the scope of the invention.

What is claimed:

1. A process for treating a charge fluid catalytic cracked naphtha containing olefin components and undesired sulfur, which comprises:

maintaining a bed of sulfided catalyst containing (i) a metal of non-noble Group VIII, and (ii) a metal of Group VI-B, and (iii) one or more metals of intentionally added Group I-A, and (iv) optionally one or more metals of intentionally added Group II-A, on a support consisting essentially of a hydrotalcite-like composition;

passing the charge cracked naphtha containing olefinic components and undesired sulfur into contact with said catalyst in the presence of a gas selected from pure hydrogen and a gas mixture comprising greater than 60% by volume hydrogen;

maintaining said charge cracked naphtha containing olefinic components and undesired sulfur in contact with said catalyst at hydrodesulfurizing conditions thereby effecting hydrodesulfurization of said charge cracked naphtha containing olefinic components and undesired sulfur and forming a product stream of desulfurized naphtha containing a decreased content of sulfur and retaining at least 50% of the olefin content of the charge cracked naphtha; and recovering said product stream of cracked naphtha containing a decreased content of sulfur;

said hydrotalcite-like composition having the formula:

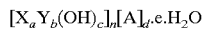

where a=1–10 b=1–10

2(a+b)=4–40

A is an anion of formal negative charge n n=an integer 1–4 d is the formal positive charge of $[X_aY_b(OH)_c]$ e=1–10

X is a divalent metal

Y is a trivalent metal of Group III or Group VI-B or non-noble Group VIII of the Periodic Table, subject to the qualification that when one of d or n is an integral multiple of the other, they are both reduced to the lowest integral terms.

2. The process for treating a charge cracked naphtha as in claim 1 wherein X is magnesium.

3. The process for treating a charge cracked naphtha as in claim 1 wherein Y is aluminum.

4. The process for treating a charge cracked naphtha as claimed in claim 1 wherein said catalyst contains potassium as the intentionally added Group I-A metal in an amount of 0.2–10 wt %.

5. The process for treating a charge cracked naphtha as claimed in claim 1 wherein said catalyst contains calcium as the intentionally added Group II-A metal in an amount of 0.1–10 wt %.

6. The process for treating a charge cracked naphtha as claimed in claim 1 wherein said catalyst contains intentionally added group I-A metal or Group II-A metal in an amount of 0.2–10 wt. %.

7. The process for treating a charge cracked naphtha as claimed in claim 1 wherein said catalyst contains cobalt as the Group VIII metal in an amount of 0.1–15 wt %.

8. The process for treating a charge cracked naphtha as claimed in claim 1 wherein said catalyst contains molybdenum as the Group VI-B metal.

9. The process for treating a charge cracked naphtha as claimed in claim 1 wherein said hydrotalcite-like composition based catalyst contains (I) 0.2–10 wt. % of at least one metal selected from the group comprising group I-A and II-A metals which are intentionally added, (ii) 0.1–15 wt. % of at least one group VIII metal, and (iii) 0.1–30 wt % of at least one Group VI-B metal, said hydrotalcite-like composition having the formula:

$$[X_aY_b(OH)_c]_n[A]_d \cdot e.H_2O$$

where
a=1–10
b=1–10
c=2(a+b)=4–40
A is an anion of formal negative charge n
n=an integer 1–4
d is the formal positive charge of $[X_aY_b(OH)_c]$
e=1–10
X is a divalent metal
Y is a trivalent metal of Group-III or Group VI-B or non-noble Group VIII of the Periodic Table,
subject to the qualification that when one of d or n is an integral multiple of the other, they are both reduced to the lowest integral terms.

10. The process for treating a charge cracked naphtha as claimed in claim 1 wherein said hydrotalcite-like composition based catalyst contains copper, phosphorus, boron or fluoride, in an amount of 0.01% to 4% by weight, calculated as elemental copper, phosphorus, boron or fluorine, respectively, based on the final catalyst weight, said hydrotalcite-like composition having the formula:

$$[X_aY_b(OH)_c]_n[A]_d \cdot e.H_2O$$

where
a=1–10
b=1–10
c=2(a+b)=4–40
A is an anion of formal negative charge n
n=an integer 1–4
d is the formal positive charge of $[X_aY_b(OH)_c]$
e=1–10
X is a divalent metal
Y is a trivalent metal of Group III or Group VI-B or non-noble Group VIII of the Periodic Table,
subject to the qualification that when one of d or n is an integral multiple of the other. they are both reduced to the lowest integral terms.

11. The process for treating a cracked naphtha as claimed in claim 1 wherein said hydrodesulfurizing conditions include temperature of 400°F.–750° F., total pressure of 200–1000 psig, liquid hourly space velocity (LHSV) of 1–15, and hydrogen feed rate of 100–6000 standard cubic feet per barrel (SCFB).

* * * * *